United States Patent Office 3,236,875
Patented Feb. 22, 1966

3,236,875
n-BUTYL-o-(ISOPROPYLTHIO)BENZOATE
Walter Reifschneider, Midland, Mich., assignor to The Dow Chemical Company, Midland, Mich., a corporation of Delaware
No Drawing. Filed June 27, 1962, Ser. No. 205,529
1 Claim. (Cl. 260—470)

The present invention is directed to thioethers and in particular is directed to novel thioether esters corresponding the formula

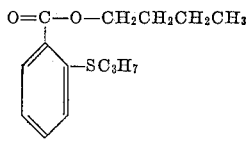

The novel compounds are colorless, moderately viscous liquids slightly soluble in water but readily soluble in various common organic solvents such as lower alkanols, benzene, and the like. The compounds are useful as herbicides, insecticides, and for the control of ticks.

The compounds can be prepared in various ways. A preferred way is a process which comprises the step of causing a reaction between an ester corresponding to the formula

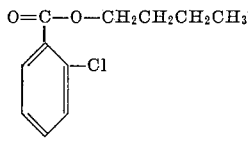

and a propyl mercaptan in which the propyl group is of desired isomeric form, or a cuprous or alkali metal salt thereof. During the reaction to prepare the present compound, one molecule of mercaptan reacts with each molecule of ester compound. Small amounts of mercaptan may be lost in side reactions. Thus, when it is desired to prepare the present compound in a high state of purity and with a minimum of necessary post-synthesis purification procedure, the starting reactants should be employed in equimolecular proportions, or preferably, with the mercaptan in slight excess. However, other proportions may be employed if desired, and unconsumed starting material of whatever identity may, if desired, be recycled into further synthesis process.

The reaction goes forward at temperatures over a wide range such as from 30° to 350° C., but initiates most readily when heated to a temperature somewhat higher than room temperature; a preferred temperature range is from 80° to 180° C. Under these conditions the reaction is, in general, exothermic and goes forward to completion with good yield calculated upon the basis of consumed starting material. When mercaptan is employed, hydrogen halide of reaction is evolved and means for its orderly disposal are advantageously provided.

Typically, in the preparation of a compound of the present invention, reaction between the mercaptan starting material and the ester starting material will initiate and go forward only when there is employed a catalytic amount of both a source of cuprous ion and a nitrogenous base. The exact weight employed is not critical. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous halide such as cuprous chloride itself or other cuprous salt may be employed. The employed weight is not critical, but may vary from a very small trace amount, less than $\frac{1}{100}$ of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as an alkanol or a petroleum oil.

It is preferred, at least in laboratory amounts, to employ the nitrogenous base catalyst substance in sufficient excess that portions of it may also act as hydrogen halide acceptor and yet further portions may continue to function, unreacted, as solvent and in the necessary catalytic manner.

In carrying out the reaction to prepare a compound of the present invention, the ester and the mercaptan are intimately mixed and blended, in any order and in desired amounts, with source of cuprous ion and nitrogenous base as hereinbefore described, and thereafter heated to a temperature at which reaction takes place promptly. In one convenient method of practicing the present method, the reaction temperature may be the reflux temperature of the liquid reaction medium. In this situation, heating may be continued at the boiling temperature of the reaction mixture and under reflux for a period of time to carry the reaction to completion.

Upon completion of the reaction, the desired compound is separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate usually forms from which the desired product can be extracted as a solvent-soluble fraction. Representative extraction solvents include diethyl ether, chlorinated hydrocarbons, and benzene. In any event, the said precipitate is extracted with solvent, the solvent extract dried over in inert drying agent such as, for example, anhydrous potassium carbonate or the like; the solvent vaporized and removed and the remaining product fractionally distilled at gradually rising temperatures and declining subatmospheric pressures.

When production of the present compound is to be carried out on an industrial scale, various other methods of separation and purification may be preferred, including, for example, centrifugation, decantation, and the like.

The following example, without more, will enable those skilled in the art to prepare the compound.

*Example.—n-Butyl-o-isopropylthio benzoate*

A reaction mixture is prepared, consisting of 21 grams (0.1 mole) of n-butyl-o-chlorobenzoate, 8 grams of cuprous oxide (technical grade) and 7.7 grams (approximately 0.1 mole) of isopropyl mercaptan dispersed in 200 milliliters lutidine. The resulting reaction mixture is placed in a flask under reflux, the reflux being equipped with a water trap. In this situation, the reaction mixture is heated at its reflux temperature (a pot temperature of approximately 150° C.) for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous sodium sulfate, the resulting liquid is warmed to vaporize and remove ether solvent and obtain a residual oil. This oil is distilled in vacuum to obtain the desired compound as a fraction boiling at 122°–125° C. under 0.7 millimeter mercury pressure, absolute, and having a refractive index of 1.5417 for the D line of sodium light at 25° C.

The compound is useful as an insecticide for the control of livestock pests. The application of a water dispersion containing 1.0 gram of the said compound as sole toxicant per 100 milliliters of resulting aqueous dispersion to a population of Lone Star ticks (*Amblyomma americana*) resulted in the kill of all of the ticks.

In procedures similar to the foregoing, but using normal propyl mercaptan there is obtained a n-butyl-o-propylthiobenzoate as a colorless liquid boiling at 131°–132° C. under pressure of 0.4 millimeter mercury absolute and of a refractive index of 1.5472 under the conditions indicated above.

I claim:
n-Butyl-o-(isopropylthio)benzoate.

References Cited by the Examiner
UNITED STATES PATENTS
2,173,827   9/1939   Donleavy _____ 260—470

FOREIGN PATENTS
203,882   8/1906   Germany.

OTHER REFERENCES
Frear, Chemistry of the Pesticides (New York, 1955), pages 100–101. SB 951. F7.

LORRAINE A. WEINBERGER, *Primary Examiner.*
DURAL McCUTCHEN, LEON ZITVER, *Examiners.*